(12) United States Patent
Imoto et al.

(10) Patent No.: US 6,580,528 B1
(45) Date of Patent: Jun. 17, 2003

(54) IMAGE READING DEVICE

(75) Inventors: Yoshiya Imoto, Ebina (JP); Hirokazu Ichikawa, Ebina (JP); Nobutoshi Hamasaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/450,561

(22) Filed: Nov. 30, 1999

(30) Foreign Application Priority Data

Feb. 5, 1999 (JP) .......................................... 11-029314

(51) Int. Cl.$^7$ ................................................ H04N 1/04
(52) U.S. Cl. ...................... 358/497; 358/474; 358/486; 358/494; 358/471; 358/475; 358/505; 358/509
(58) Field of Search ................................. 358/475, 509, 358/474, 497, 494, 505, 486, 471; 250/234, 208.1

(56) References Cited

U.S. PATENT DOCUMENTS

| | | | | |
|---|---|---|---|---|
| 5,414,534 A | * | 5/1995 | Binton | ........................ 358/483 |
| 5,786,901 A | * | 7/1998 | Okada et al. | ................ 358/474 |
| 5,920,342 A | * | 7/1999 | Umeda et al. | .............. 348/211 |
| 6,108,036 A | * | 8/2000 | Harada et al. | ............... 348/219 |
| RE37,783 E | * | 7/2002 | Jean | ............................ 250/234 |

FOREIGN PATENT DOCUMENTS

| | | |
|---|---|---|
| JP | 51-25914 | 3/1976 |
| JP | 6-261236 | 9/1994 |
| JP | 7-283915 | 10/1995 |

* cited by examiner

Primary Examiner—Cheukfan Lee
(74) Attorney, Agent, or Firm—Morgan, Lewis & Bockius LLP

(57) ABSTRACT

A reading scan controlling unit drives a scanning motor in accordance with a signal from a reading instructing unit and a line synchronous generating unit for scanning a document plural times in a slow-scanning direction, as well as controls a sensor driver to read a document image. At this time, an optical flat plate driving unit is controlled in the second and following scans to incline an optical flat plate provided in an imaging optical path at a predetermined angle in a fast-scanning direction, so that the imaging position on a CCD sensor in a fast-scanning direction is slightly changed. Further, the scanning speed is determined in accordance with the scanning times. An image reading device having such a construction can perform high-speed reading with high precision by using an image shift method.

17 Claims, 13 Drawing Sheets

SAMPLING WITH 600 DPI    1200 DPI ONLY IN SLOW-SCAN    PERFORM SHIFT OF PIXEL IN FAST-SCAN

OPTICAL PATH IN INITIAL CONDITION

SHIFT AMOUNT OF IMAGING POSITION

OPTICAL PATH AFTER CHANGING IMAGING POSITION

OPTICAL PATH IN INITIAL CONDITION

ROTATIONAL AMOUNT OF PARALLEL FLAT PLATE

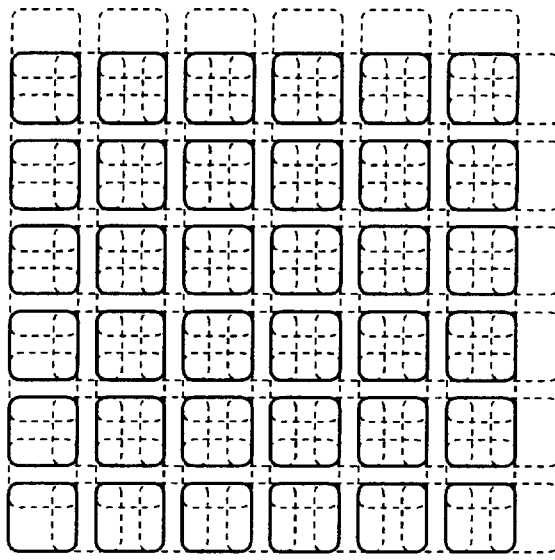
FIG.10C PERFORM SHIFT OF PIXEL IN FAST-SCAN
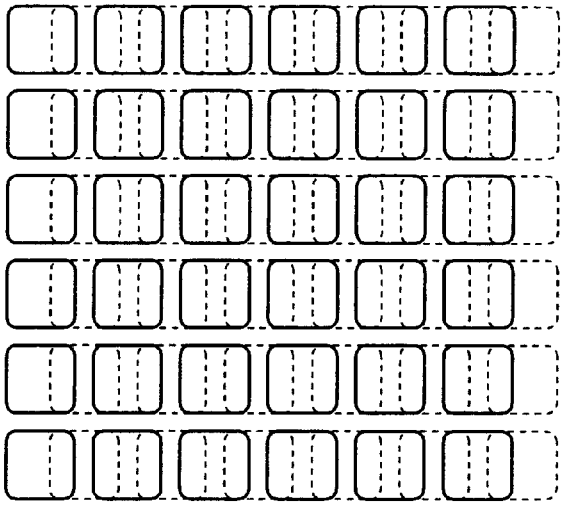
FIG.10B 1200 DPI ONLY IN SLOW-SCAN
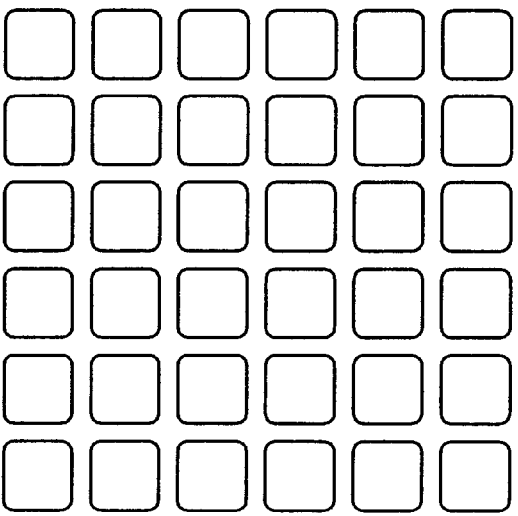
FIG.10A SAMPLING WITH 600 DPI

READING IN NORMAL MODE

READING IN MODE OF DOUBLE SAMPLING DENSITY

DRIVING OF FLAT PLATE

IMAGE READING DEVICE

BACKGROUND OF THE INVENTION

1. Field of the Invention

The present invention relates to an image reading device performing image reading with high precision.

2. Description of the Prior Arts

High precision of an output image from a printer or the like has been recently developed, and therefore, a demand for high-speed and high-precision to an image reading device has risen. However, in an image reading device used for a normal digital copying machine or the like, only ones having its reading resolution (sampling density) of about 400 to 600 dpi have been put on a practical use due to a limitation in a pixel number, sensitivity, driving speed or the like of an image sensor used therefor. There has been a problem of generating a sampling moire when, for example, a printing document having a mesh screen structure is read by a reading device having only a reading resolution of 400 to 600 dpi. Further, a problem has occurred that reproducibility of a fine character in a map document or the like is insufficient.

It is effective for controlling the sampling moire that reading MTF in the vicinity of the Nyquist rate is reduced by optical parts such as a birefringent plate or the like or image processing parts such as a filtering. However, these methods involve a blur in the reading image to entail a problem of deteriorating reproducibility of a character.

An image reading device having a high sampling density that does not deteriorate the character reproducibility even if the reading MTF is reduced at the Nyquist rate is required, in order to obtain both of restraint of the sampling moire and the character reproducibility. However, it is very difficult to manufacture the image sensor having more than twice as many pixels as a conventional one in order to deal with this, whereby it is difficult to obtain a high-speed and highly precise reading device.

Therefore, the image reading device is branched to two types, i.e., a high-speed reading device for a digital copying machine and a reading device with low speed and high precision used by connecting with a PC. However, it is desired to obtain one reading device capable of being performing high-speed reading and highly precise reading.

On the other hand, there has been proposed a technique for attempting to establish high resolution with a sensor of less pixels by using an image shift method in which a sampling phase is shifted by ½ pixels (Japanese Unexamined Patent Application No. Sho 51-25914 or the like) . In particular, there have been many proposals about the usage for a video camera using an area sensor (Japanese Unexamined Patent Application No. Hei 6-261236). This method performs sampling with a density double that of the sensor pitch, so that the size of the photosensitive pixel becomes approximately double that of the sampling pitch. Accordingly, the Nyquist resolution can theoretically be reduced to restrain the sampling moire, so that this method is suited for highly precise reading. As a part that implements such an image shift method, there has been known a device in which an optical flat plate is disposed in an optical path, a device using an optical element that prevents a camera from moving upon pressing the button, called as a variable-angle prism, a device in which a sensor itself is slightly moved and the like.

However, the image shift method according to a conventional technique performs the image shift for every exposing period of a reading sensor. When such a mechanism is applied to high-speed reading by a linear sensor, the exposing period per line is short, so that the image shift mechanism has to be driven with high speed of several thousands Hz. Further, there is a drawback that the vibration due to the driving of the image shift mechanism causes a bad influence to a reading image quality. Therefore, the conventional technique entails a problem of not dealing with high-speed reading.

Moreover, the image shift mechanism cannot be perfectly halted in order to perform high-speed driving of the image shift mechanism simultaneous with the slow-scan, so that the image cannot be rendered stationary, to thereby entail a problem of not being capable of strictly forming a new sampling point between pixels. Japanese Unexamined Patent Application No. Hei 7-283915 discloses a combination of the image shift method and digital interpolation of a sampling point with respect to this problem. However, the number of the substantial sampling point is reduced, whereby there is a problem of not sufficiently utilizing an inherent performance of the image shift method.

On the other hand, when the image shift method is executed by using an area sensor, its driving frequency is normally low-speed such as several ten Hz, whereby a minute image shift can actually be implemented. However, the number of pixels of the area sensor generally used is several million (1000×1000 to 2000×3000 pixels) at most, thereby entailing a problem that it is insufficient for highly precise reading of a reflective document.

SUMMARY OF THE INVENTION

In order to solve the problems, the present invention provides an image reading device capable of performing a high-speed and highly precise reading without generating a sampling moire by using an image shift method.

The image reading device of the present invention has a reading part that reads an optical image of an object to be read, a moving part that moves in a slow-scanning direction a reading position of the object, a scan controlling part that scans the object plural times by controlling the moving part, a reading position changing part that changes in a fast-scanning direction the reading position of the object for every scan by the scan controlling part, and a moving speed changing part that changes the moving speed of the reading position in accordance with the number of scanning times.

With the above configuration, when an optical image of the object to be read is read while moving the reading position of the object to be read by the reading part in the slow-scanning direction by the moving part, the moving part is controlled by the scan controlling part so as to scan the object to be read plural times as well as the reading position of the object to be read by the reading part is changed by the reading position changing part in the fast-scanning direction for every scan by the scan controlling part, and further, the moving speed by the moving part is changed by the moving speed changing part in accordance with the scanning times by the scan controlling part. Therefore, it is possible to perform highly precise reading with a several-fold sampling density only by adding a simple mechanism, so that it is possible to eliminate a phenomenon inherent to digital reading such as moire. Further, the scan is performed in the slow-scanning direction with a scanning speed in accordance with the scanning times when performing a reading scan plural times, whereby the sampling density in the slow-scanning direction can be changed, as well as the sampling density in the fast-scanning direction can be changed by performing the image shift for every reading scan. Accordingly, it is unnecessary to execute the image shift in a short time, to thereby be capable of performing high-speed and highly precise reading.

BRIEF DESCRIPTION OF THE DRAWINGS

Preferred embodiments of an image reading device according to the present invention will be described in detail based on the drawings:

FIGS. 10A to 10C illustrate the scanning direction and the sampling position;

DESCRIPTION OF THE PREFERRED EMBODIMENTS

A. First Embodiment

A-1 Construction of the First Embodiment

Figure 1:
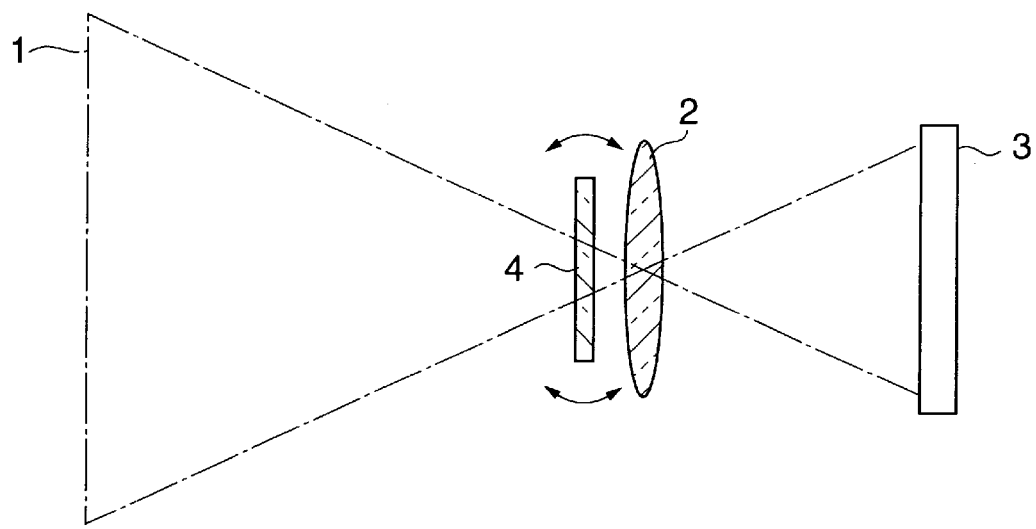
FIG. 1 is a schematic view showing a part of a construction of an optical system in a document reading device according to the first embodiment of the present invention.

FIG. 1 is a schematic view showing a part of a construction of an optical system in a document reading device according to the first embodiment of the present invention. An optical system comprises an imaging optical system composing of a document 1, an imaging lens 2 and a CCD sensor (line sensor) 3 and an optical flat plate 4 inclinably positioned between the imaging lens 2 and the document 1.

Figure 2:
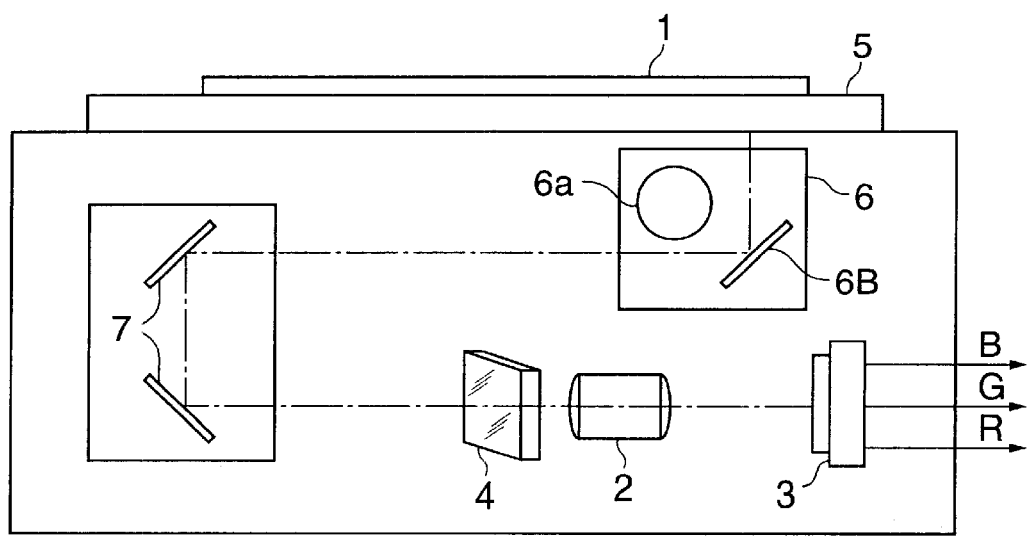
FIG. 2 is a schematic constructional view showing an entire construction of the document reading device according to the first embodiment.

Subsequently, FIG. 2 is a schematic constructional view showing an entire construction of a document reading device according to the first embodiment. The document 1 placed on a platen glass 5 disposed at the upper surface of the reading device is illuminated by a lamp 6a mounted on a full-rate scanning unit 6. The illuminated document image is formed on the CCD sensor 3 by the imaging lens 2 via a full-rate mirror 6b and a half-rate mirror 7. This formed document image is photoelectrically converted to be read as electronic image information. Further, the relative positional relationship between the document 1 and the CCD sensor 3 is sequentially changed by scans of the lamp 6a and full-rate mirror 6b as well as a scan of the half-rate mirror 7, so that optical information of the entire document can be read. A lens of f 80 mm, half-angle of view of 19.3 degrees and FNo. of 4.5 is used as the imaging lens 2. A three line CCD color sensor of 7500 pixels is used as the CCD sensor 3.

At least two scans are executed in the first embodiment. The optical flat plate 4 disposed immediately before the imaging lens 2 is arranged perpendicular to an optical axis in the first scan, while the optical flat plate 4 is inclined at a predetermined angle in the fast-scanning direction in the second and following scans, whereby the imaging position on the CCD sensor 3 in the fast-scanning direction is slightly changed.

In the case of the device performing a full-color reading by using a color CCD sensor, generally an infrared cut filter is generally positioned in front of the imaging lens in order to compensate the extraneous sensitivity in the infrared area that is attributed to on-chip color filter characteristics. In this case, the infrared cut filter is used as the optical flat plate 4, and the imaging position may be shifted by inclining the optical flat plate 4.

Figure 3:
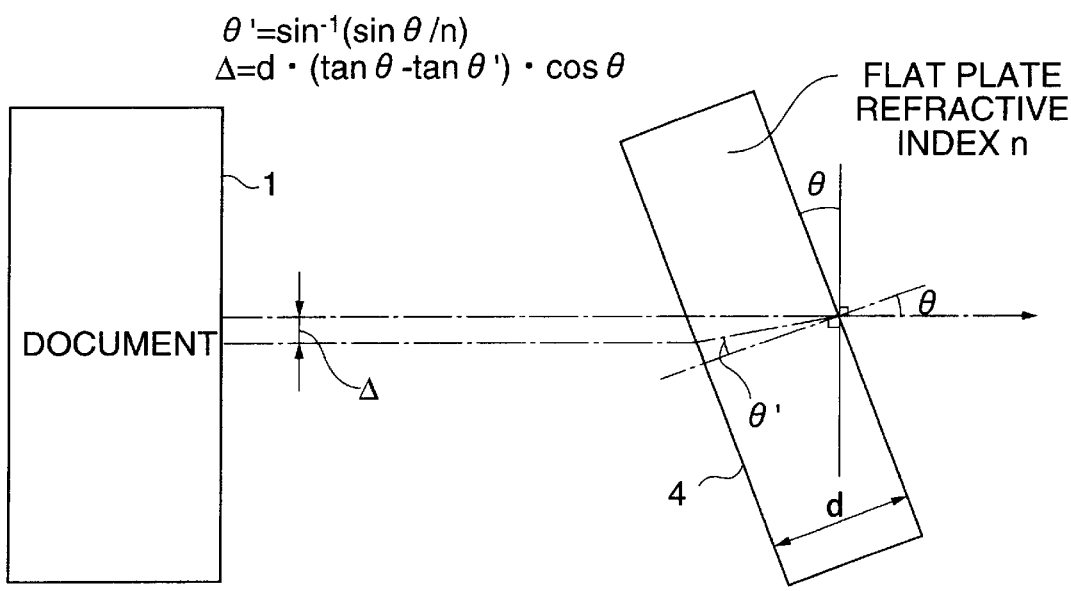
FIG. 3 is a conceptional view showing how the imaging condition changes on a CCD sensor 3 depending upon the inclination of an optical flat plate.
Figure 4:
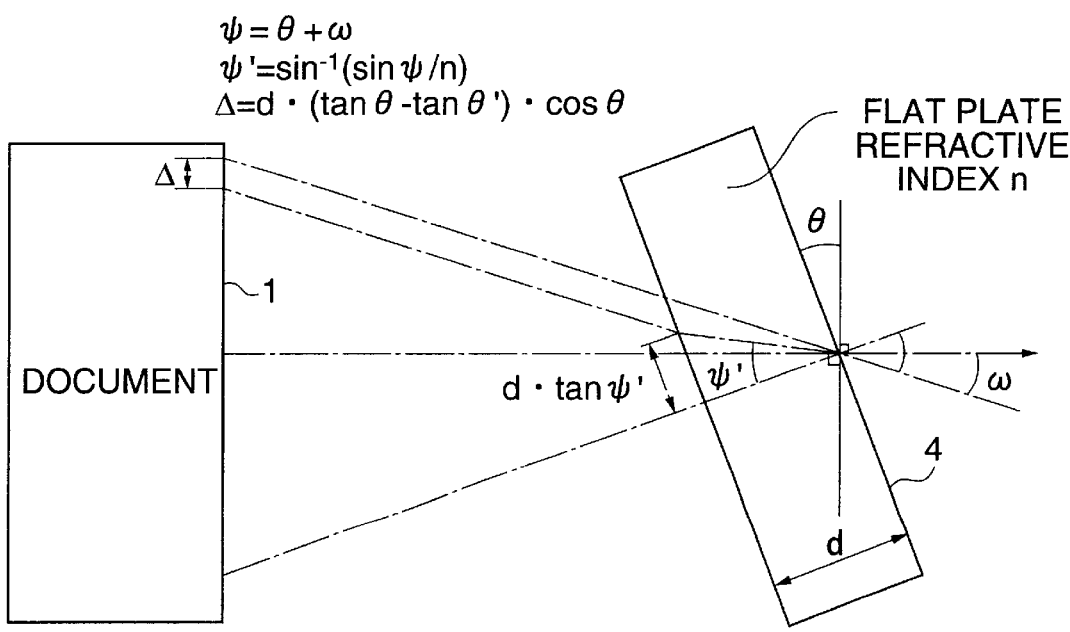
FIG. 4 is an amount of a shift of the imaging position on the CCD sensor depending upon the slope of the optical flat plate.
Figure 5:
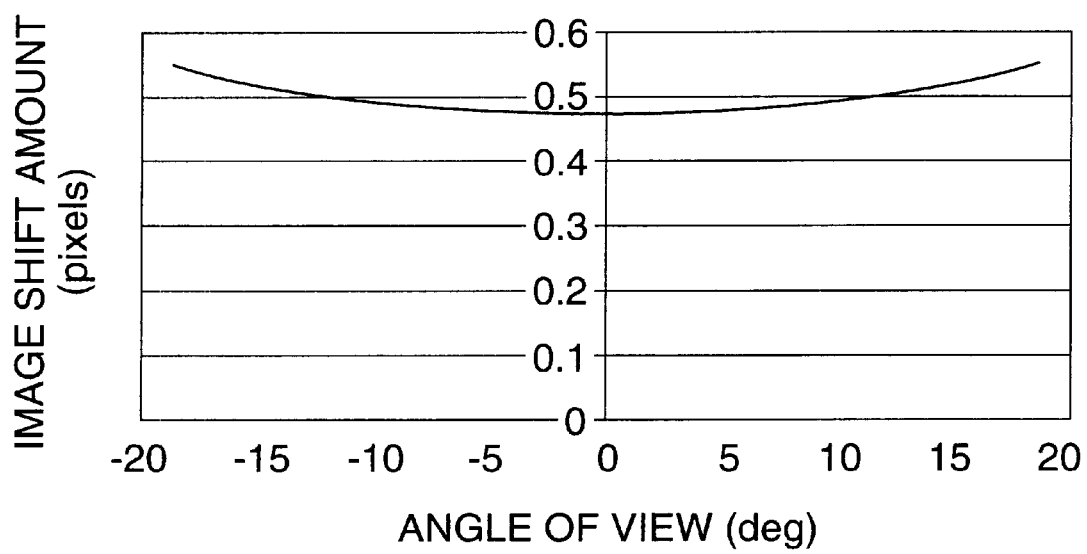
FIG. 5 is a conceptional view showing a relationship between an angle of view and an image shift amount.

Subsequently, FIG. 3 is a conceptional view showing how to change the imaging condition on the CCD sensor 3 depending upon the slope of the optical flat plate 4. From the characteristics of the laws of refraction and circular functions of light, a parallel shift amount Δ of an optical ray is obtained from a formula shown in FIG. 3 in the case where the thickness of the optical flat plate 4 is d, a refractive index is n and the optical flat plate 4 is inclined with a slope angle of θ. Further, this relationship is slightly different between an image center portion and an image vicinity portion having an angle of view, so that it is obtained from the formula shown in FIG. 4 from a half-angle of view ω and a slope angle θ of the optical flat plate 4. Specifically, in the case where the optical flat plate 4 is an infrared cut filter having a thickness of 1.0 mm made of CAW 500 (manufactured by Hoya Corp., a glass refractive index thereof is 1.55), it is understood that the optical flat plate 4 may be inclined at 3.2 degrees by adopting the relationship. FIG. 5 is a conceptional view showing a relationship between an angle of view and an image shift amount. When the document is sampled with 600 dpi (one pixel is 42.4 microns), an image shift of 0.46 pixels in the center portion and 0.56 pixels in the vicinity thereof is obtained as shown in FIG. 5, to thereby be capable of realizing an image shift of approximately 0.5 pixels.

Figure 6:
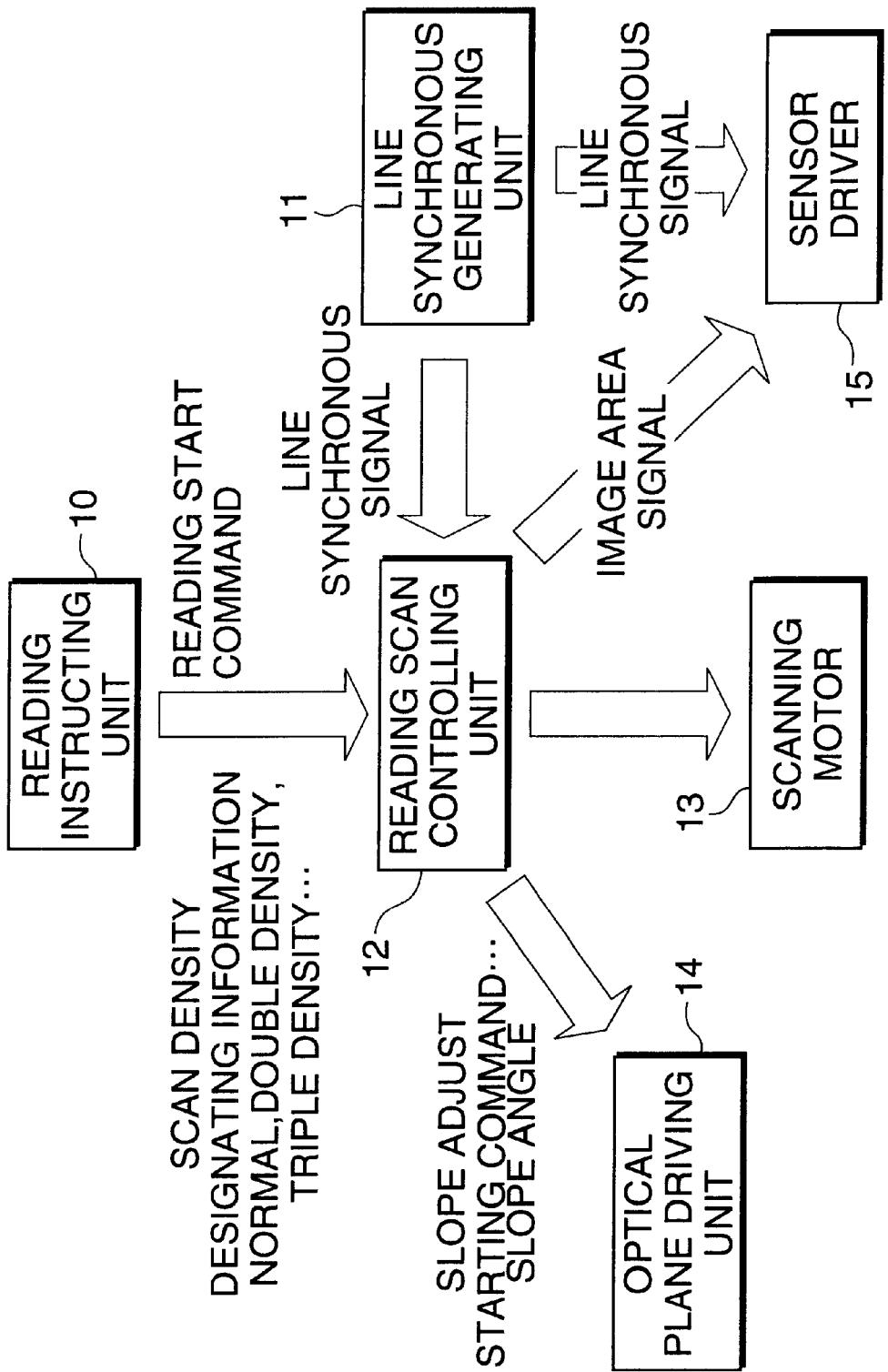
FIG. 6 is a block diagram showing a construction of a controlling and driving system of the image reading device according to the first embodiment.

Next, FIG. 6 is a block diagram showing a construction of a controlling and driving system of the image reading device according to the first embodiment. A reading instructing unit 10 gives to a reading scan controlling unit 12 scan density set designating information (information showing whether it is normal, double-density or triple-density) and a reading start command. A line synchronous generating circuit 11 generates a line synchronous signal to be supplied to the reading scan controlling unit 12.

The reading scan controlling unit 12 sends a motor driving waveform to a scanning motor (stepping motor) 13 in accordance with the scan density set designating information and reading start command supplied from the reading instruction unit 10, as well as sends a slope adjust starting command and slope angle to an optical flat plate driving unit 14. Specifically, the reading scan controlling unit 12 determines the reading scan times by the scan density set designating information. For example, the reading scan times is one time in the case where the scan density set designating information is normal, twice in the case of the double-density, and three times in the case of the triple-density. Moreover, the reading scan speed that determines the sampling density in the slow-scanning direction is determined one by one in accordance with the reading scan times, i.e., determined to ½ scan speed (twice), ⅓ scan speed (three times) or the like with respect to the normal scan speed (once).

The reading scan controlling unit 12 supplies a driving waveform in which an exciting frequency to the scanning motor 13 is ½ in the case where the reading scan speed becomes ½. By this, the scanning speed becomes a half that of the normal scanning speed. At this time, the scan starting timing is determined by a timing when the reading scan controlling unit 12 send the motor driving waveform, while the reading scan times is similarly determined by the number of times to supply the motor driving waveform. Further, the reading scan controlling unit 12 knows a period from the time when the motor driving waveform is sent out to the time when the CCD sensor 3 enters into the reading position, whereby it sends an image area signal in accordance with the period to a sensor driver unit 15 that controls the CCD sensor 3. Additionally, the scanning motor 13 scans the lamp 6a, full-rate mirror 6b and half-rate mirror 7 in the slow-scanning direction by the motor driving waveform. The optical flat plate driving unit 14 controls the slope angle of the optical flat plate 4 in accordance with the slope adjust starting command and slope angle. The sensor driver unit 15 controls the CCD sensor 3 in accordance with the image area signal and line synchronous signal.

Figure 7:
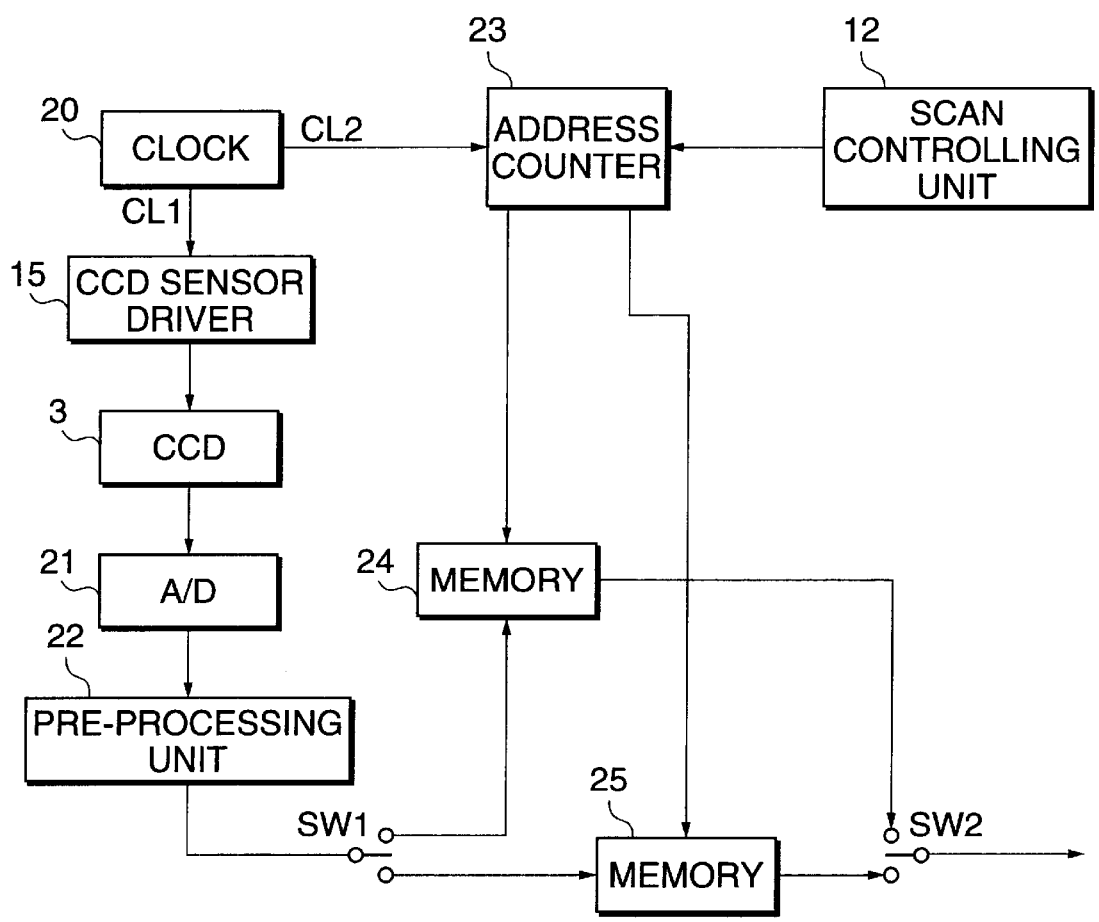
FIG. 7 is a block diagram showing a construction of a circuit for composing the image read twice in the image reading device according to the first embodiment.

Subsequently, FIG. 7 is a block diagram showing a construction of a circuit for composing the image read twice in the image reading device according to the first embodiment. The portions corresponding to the portions in FIG. 2 or 6 are denoted by the same numerals for explanation. In the figure, a clock generator 20 generates a clock CL1 supplied to the CCD sensor driver 15 and a clock CL2 synchronized with the scanning line, and then, supplies them respectively to the CCD sensor driver 15 and address counter 23. The CCD sensor driver 15 scans the CCD sensor 3 based upon the clock to read the image (every R, G and B) formed on the CCD sensor 3, and then, supplies the image to an A/D converter 21. The A/D converter 21 converts the image signal into a digital signal and supplies the converted signal to a pre-processing unit 22. The pre-processing unit 22 performs predetermined image processing to the image data.

The address counter 23 is reset to [0] with the image area signal supplied from the reading scan controlling unit 12. After that, the address counter 23 counts the clock (the clock synchronized with the pixel and the clock synchronized with the scanning line) that drives the CCD sensor 3, generates the addresses of a memory 24 and a memory 25 and supplies the counted clock to the memory 24 and memory 25.

A switch SW1 is turned on at the side of the memory 24 in the first reading scan, while turned on at the side of the memory 25 in the second reading scan. Accordingly, the image data read by the first reading scan is stored in the memory 24 via the switch SW1 in accordance with the address supplied from the address counter 23. Further, the image data read by the second reading scan is stored in the memory 24 via the switch SW1 in accordance with the address supplied from the address counter 23. Moreover, a switch SW2 is alternately turned on at the side of the memory 24 or the side of the memory 25 for every pixel when outputting the image data stored in the memory 24 or memory 25. Therefore, image data composed for every pixel is outputted from the memory 24 and memory 25 via the switch SW2.

Taken here is a circuit assuming the case for supplying data to a digital copying machine, but in the case where data is read to PC or the like connected to a network as a network scanner, the above-mentioned memory composing unit of the reading data is not necessarily provided in the image reading device. Specifically, it is possible, in the image reading device, to perform control of the slow-scanning density and control of the optical flat plate driving unit 14 for sending out each piece of image data read by a plurality of scans to PC via the network as several image files, and then, to perform file composition by the software of PC. Such a construction enables to facilitate to set the reading scan of the triple-density, not only the simple double-density, by setting the control of the slope angle of the optical flat plate 4 at intervals of ⅓ pixels, setting the scan reading times to three times and tripling the sampling density in the slow-scanning direction. The reading scan of the four-fold density can be set in the same manner.

Figure 8A:
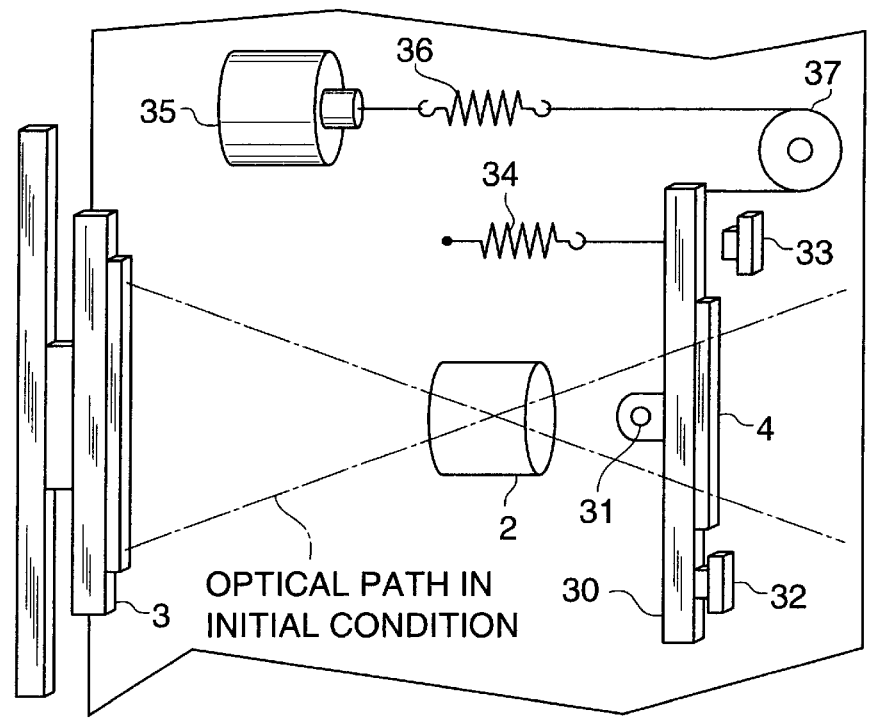
FIGS. 8A and 8B are typical views showing a mechanism for inclining the optical flat plate in the fast-scanning direction.
Figure 8B:
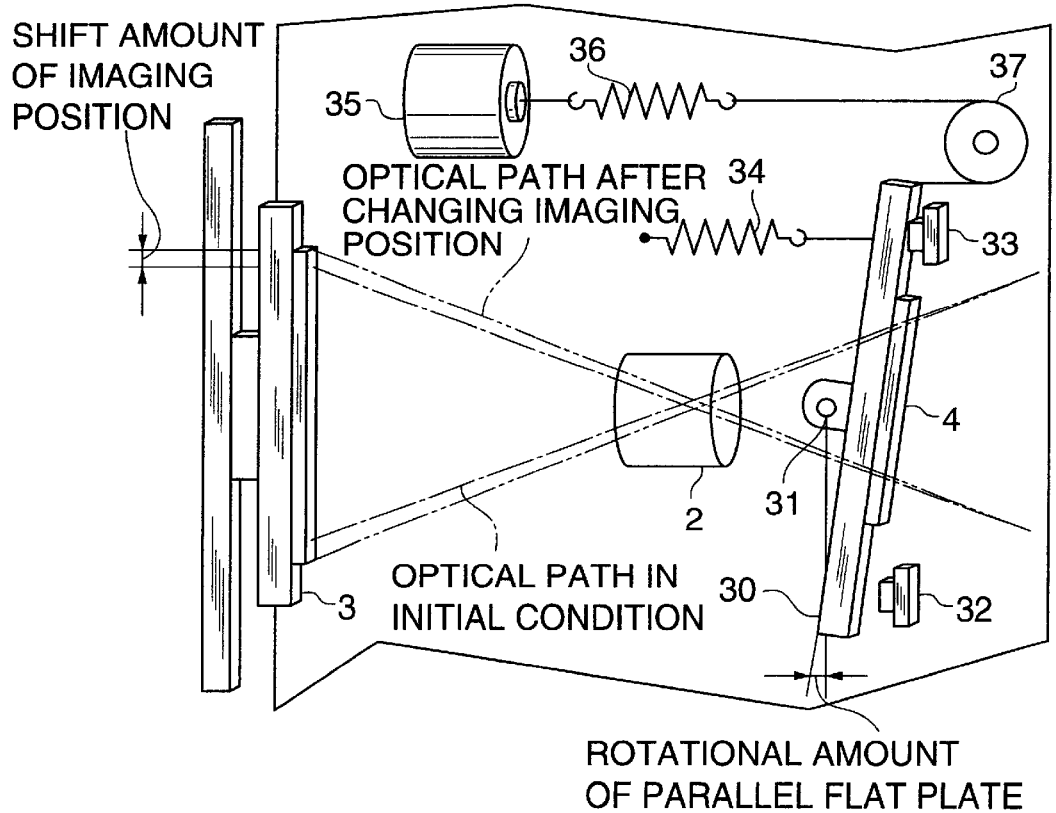

Next, FIG. 8A is a typical view showing a mechanism for inclining the optical flat plate in the fast-scanning direction. The parallel flat plate 4 arranged at the front surface of the imaging lens 2 is supported by a flat plate supporting mechanism 30 that is installed in the main body of the device so as to be rotatable about a rotation axis. Further, the rotation range of the flat plate supporting mechanism 30 is limited by two stoppers 32 and 33. The flat plate supporting mechanism 30 is fixed in a normal state such that it is pressed against the stopper 32 for setting an initial position by an operation of a spring 34 for an initial imaging position. On the other hand, upon performing the image shift, a solenoid 35 in the figure is driven and the flat plate supporting mechanism 30 is pulled so as to be pressed against the stopper 33 for setting to change the fast-scanning imaging position via a spring 36 for absorbing a stroke deviation and an idler pulley 37, to switch over the state of the image shift. FIG. 8B is a typical view showing a mechanism in a state where the image shift is executed.

Figure 9:
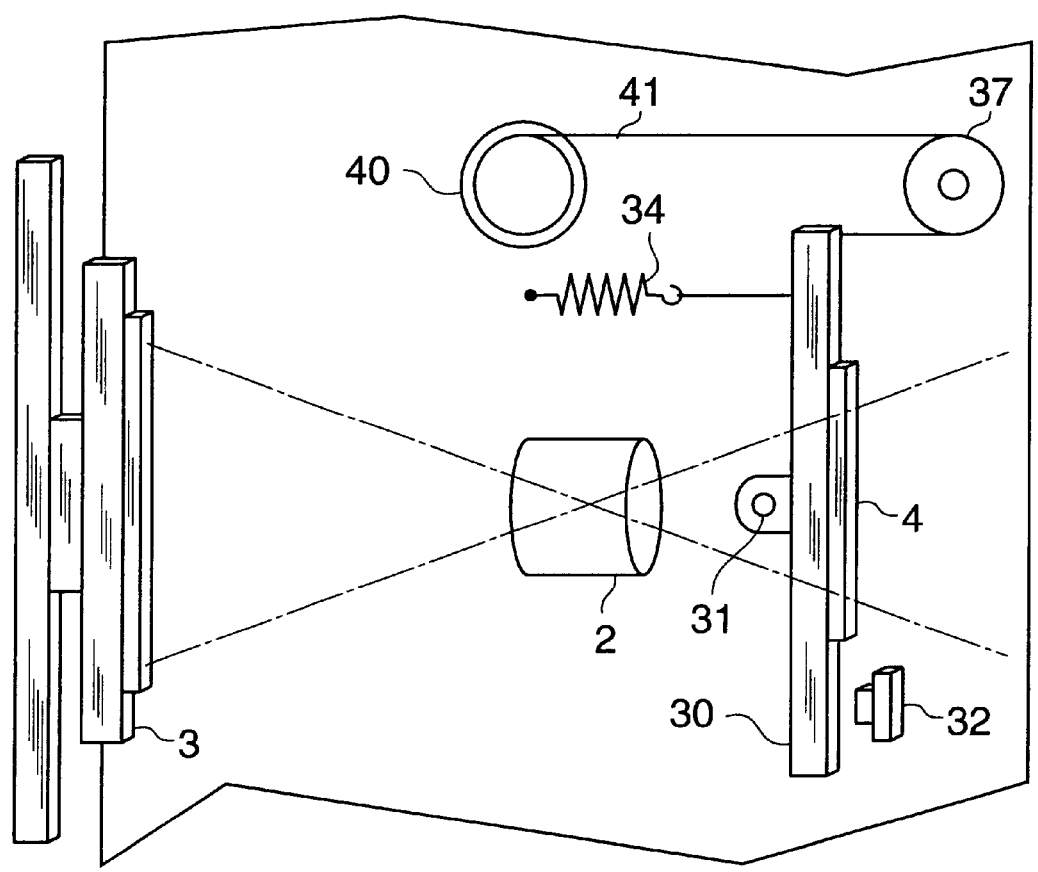
FIG. 9 is a typical view showing a construction in which the image shift amount is switched every [1/n] pixels.

The optical flat plate 4 may be moved once during the period from the termination of the mechanical scan to the next start of the scan. Therefore, there is no technical difficulties that the optical flat plate 4 is switched over for every exposing period to be driven with high speed as explained in the prior arts, so that the image shift mechanism can be constructed by a simple mechanism as described above. FIGS. 8A and 8B show a construction in which the image shift amount is switched between [0] and [½]. FIG. 9 shows a construction in which the image shift amount is switched every [1/n] pixels. The portions corresponding to the portions in FIG. 8 are denoted by the same numerals and its explanation is omitted here. The solenoid 35 is changed to a stepping motor 40, and the stepping number applied to the stepping motor 40 is counted, whereby the amount for rolling a wire 41 is adjusted to thereby control the slope angle of the optical flat plate 4 at intervals of [1/n] pixels.

Figure 11A:
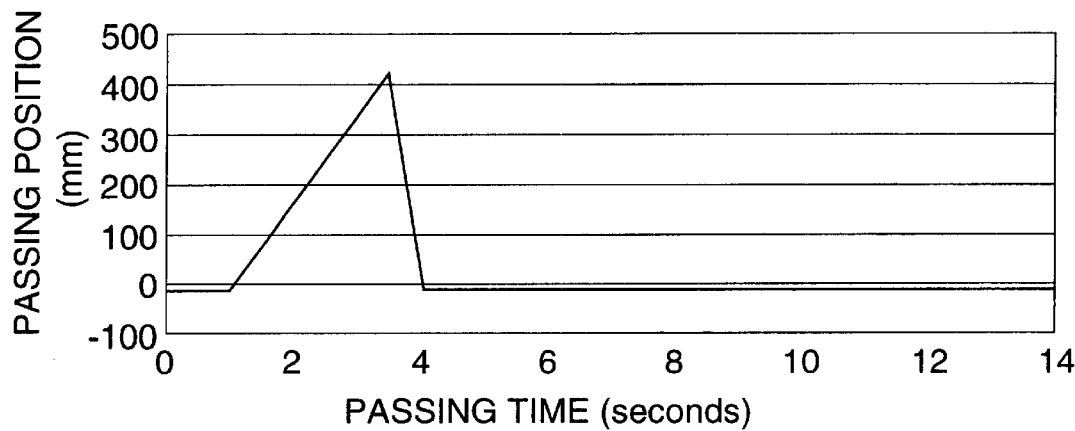
FIGS. 11A to 11C show a relationship between the scan passing time and the reading position.

Subsequently, an operation of the image reading device in the actual reading scan will be explained. In case where the document of A3 size (width of 300 mm) is read out by the CCD sensor having 7500 pixels in a normal mode, a mechanical scan is executed with a fast-scanning sampling density of 600 dpi and a slow-scanning sampling density of 600 dpi that is coincided with the fast-scanning sampling density. FIG. 10A is a conceptional view showing a state in which the document is sampled under the condition. Further, FIG. 11A is a conceptional view showing a relationship between the scan passing time and the reading position under the same condition. If the reading time for one line determined by the exposure scanning time of the CCD image sensor is set to 0.212 ms, the slow-scanning reading speed is 1/(0.000212×23.62)=200 mm/s in the case of reading with the slow-scanning sampling density of 600 dpi (23.62 dot/mm).

Figure 11B:
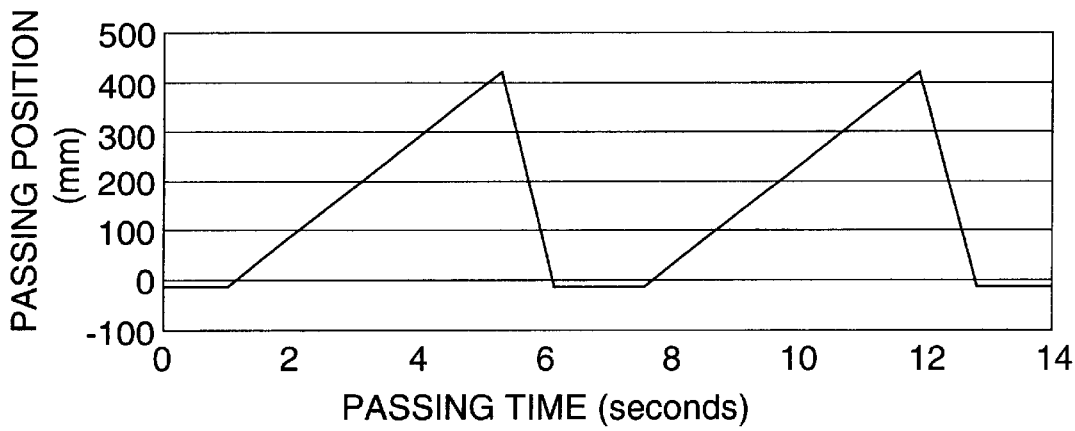
Figure 11C:
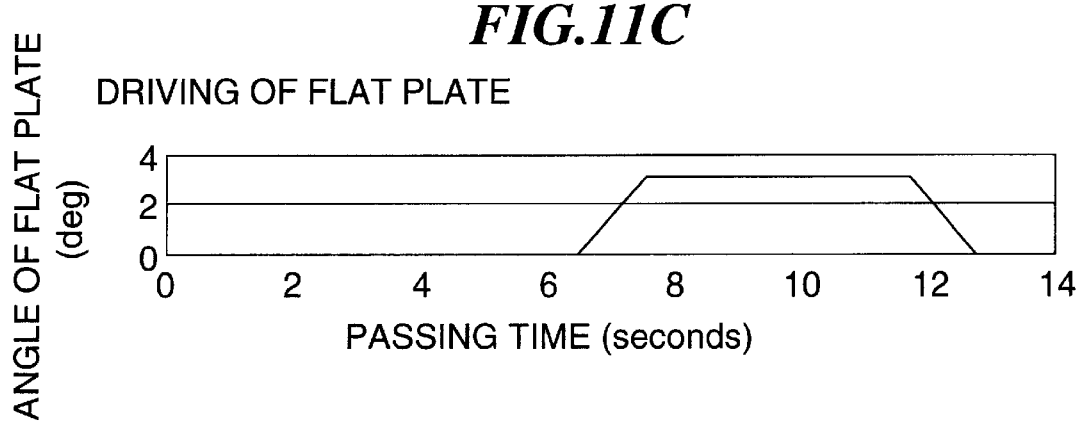

On the other hand, FIG. 11B shows a conceptional view showing a relationship between the scan passing time and the reading position of the document in the case of reading with the sampling density of 1200 dpi. If the slow-scanning sampling density is set to 1200 dpi (47.24 dot/mm), the slow-scan reading speed becomes 1/(0.000212s×47.24 dot/mm)=100 mm/s. This speed is a half that of the case of reading with 600 dpi as described above. The reading scan is performed twice at this speed. The angle of the optical flat plate 4 is changed by 3.2 degrees with this two scans as shown in FIG. 11C, to thereby be capable of shifting the imaging position by ½ of the sampling pitch.

In this case, the sampling point read by the first scan is shown in FIG. 10B. The sampling density becomes 1200 dpi in the slow-scanning direction, while the sampling density in the fast-scanning direction is the same as that in the normal mode. The sampling position is shifted by 0.5 pixels in the fast-scanning direction by the optical flat plate 4 in the second scan and the image obtained by the first scan is composed with the image obtained by the second scan, thereby being capable of performing reading with the reading scan density of 1200 dpi in both the fast-scanning and slow-scanning directions.

The size of the sampling window determined by the size of the photosensitive pixel of the CCD sensor 3 is approximately twice larger than that of the sampling pitch, so that MTF of the reading data in the Nyquist rate becomes approximately [0]. Specifically, this means that the ideal reading with very small moire can be performed. Additionally, the pixel size becomes twice larger than that of the reading pitch (four times as large as the area thereof) compared with the reading by an exclusive sensor of 1200 dpi, whereby the sensitivity is enhanced and S/N is not deteriorated even when the reading is performed at high speed.

In the case where the reading scans of twice are intended to be performed with each of the sampling positions shifted with each other by a half pixel in the fast-scanning direction in this way, a shift is generated between the reading images of twice if the mechanical scanning precision is worse, whereby a satisfactory reading image cannot be obtained. However, a reading scan system in a digital color copying machine that performs the reading scan four times with the four-color printing of the color printing unit takes measures to improve the color registration precision by using a poly phase stepping motor. Therefore, such a reading scan system is highly precise in reading scan, so that it is suited for the above-mentioned reading.

Further, although it is likely to be considered that the absolute precision of the sampling position is required by about 5 microns or less in order to perform the reading with 1200 dpi (21.2 micron pitch) in this method, it is actually enough that the repeated precision between two scans is about 5 microns or less. Therefore, a sufficient precision can be obtained in view of the repeated precision in the scan using a metallic wire utilized for a scanning system of the digital color copying machine.

Figure 12:
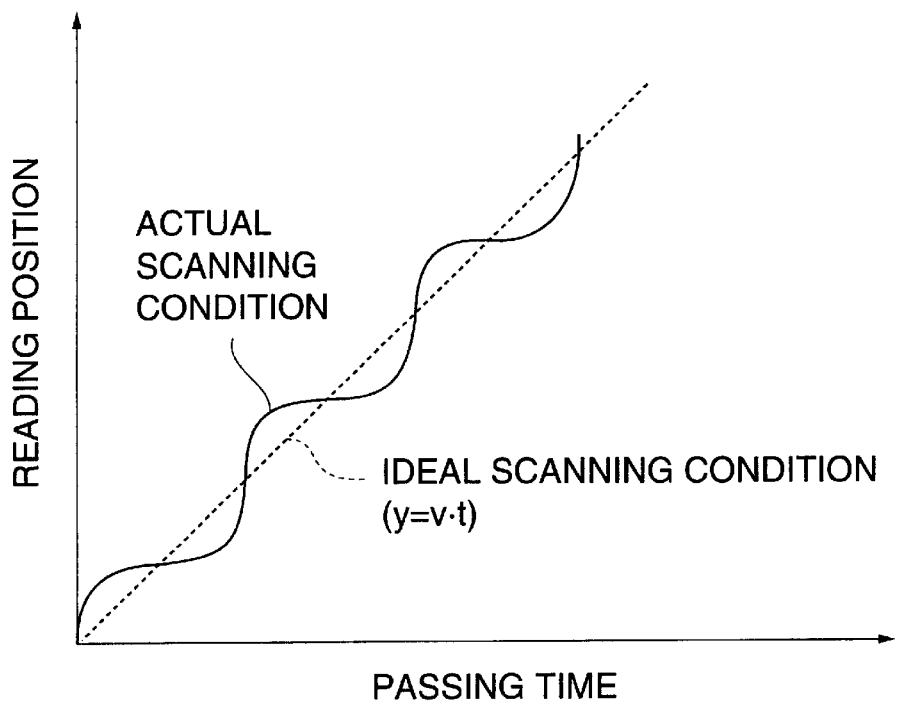
FIG. 12 is a conceptional view showing a relationship between the respective passing time and the reading position of ideal reading in which the absolute precision of the sampling position is maintained and of the actual reading scan in order to compare the ideal reading and actual reading position.

Subsequently, FIG. 12 is a conceptional view showing a relationship between the respective passing time and the reading position of the ideal reading in which the absolute precision of the sampling position is maintained and of the actual reading scan in order to compare the ideal reading with actual reading position. It is understood from the figure that, in the actual reading scan, the absolute precision of the sampling cannot be obtained due to an influence of the transient vibration when actuating the reading scan or of the irregularity in the speed of the scanning system, so that an error occurs with respect to the absolute sampling position (referring to the solid line). However, the transient vibration or the irregularity in the speed is reproduced under the same condition if the scan is executed plural times under the same scanning condition, whereby the positional reproducibility between the scans of plural times is maintained with high precision. By this, the sampling position is shifted in the fast-scanning direction upon reading by the scans of plural times, so that the same position is read with respect to the slow-scanning direction. Therefore, a reading image with high precision can be reproduced by composing the image data read by the respective scans.

Figure 13:
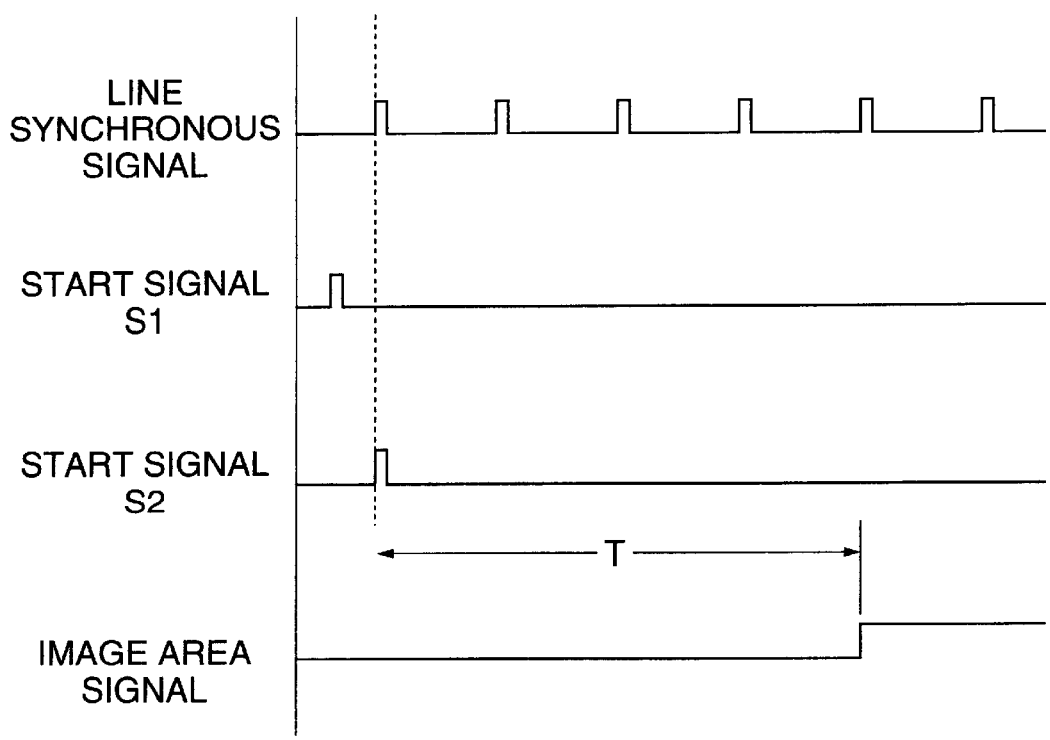
FIG. 13 is a conceptional view explaining a repeat accuracy in scans of plural times.

There are two important factors in addition to the scanning mechanism itself for obtaining the repeat accuracy in the scans of plural times. One of them is synchronism of the driving signal that drives the CCD sensor 3 and a scanning signal that drives the scanning motor 13. If the synchronism is not established between the driving signal and the scanning signal, a shift of one line occurs in the slow-scanning direction (21.2 microns) at the maximum. FIG. 13 shows a structure for preventing the shift. A reading start signal S2 is obtained by synchronizing the reading start signal S1 with a synchronizing signal (line synchronous signal) of the scanning line possessed by the system. This reading start signal S2 is triggered, so that the reading scan controlling unit 12 sends a driving waveform to the scanning motor 13. Further, the scanning motor 13 is scanned based upon a driving pulse that has been determined in advance, whereby the reading scan controlling unit 12 knows in advance the period required from the time when the motor is started to be driven to the time when the document is started to be read in portion. Accordingly, after the pre-determined delay time T, the reading scan controlling unit 12 sends an image area signal, showing that the reading area has been read, from the reading start signal S2 based upon the period required. This image area signal is resultingly synchronized with the line synchronous signal. Therefore, the scans of plural times can be executed without generating the shift in the scanning position due to the synchronous shift by driving the CCD sensor 3 in accordance with the image area signal and the line synchronous signal.

The other one of them is an operational condition of the scanning system. It is assumed that the mechanical scanning system is halted and the scan is performed plural times after a short time has passed. In this case, a load taking to the scanning motor 13 at the time of starting the scan is different between the first scan and the second and the following scans due to the influence that a sliding unit such as a scanning rail unit not shown starts fixing, thereby causing a shift in the scanning position. Moreover, the halting attitude of the unit to be scanned is slightly changed by a passing time after the termination or driving condition at the time of termination, that relates to the reproducibility of the scan. Therefore, it is desirable to provisionally move the unit to be scanned for escaping from the fixing state of the sliding unit, at the start of the reading scan of plural times. Specifically, it is desirable to perform the same movement under the actual scanning condition as a dummy scan in order to further enhance the scanning precision. By taking such a measure with respect to the scan reading system of the digital color copying machine, the reproducible precision of the scan of 5 microns or less sufficient for implementing the present method can be obtained.

B. Second Embodiment

Figure 14A:
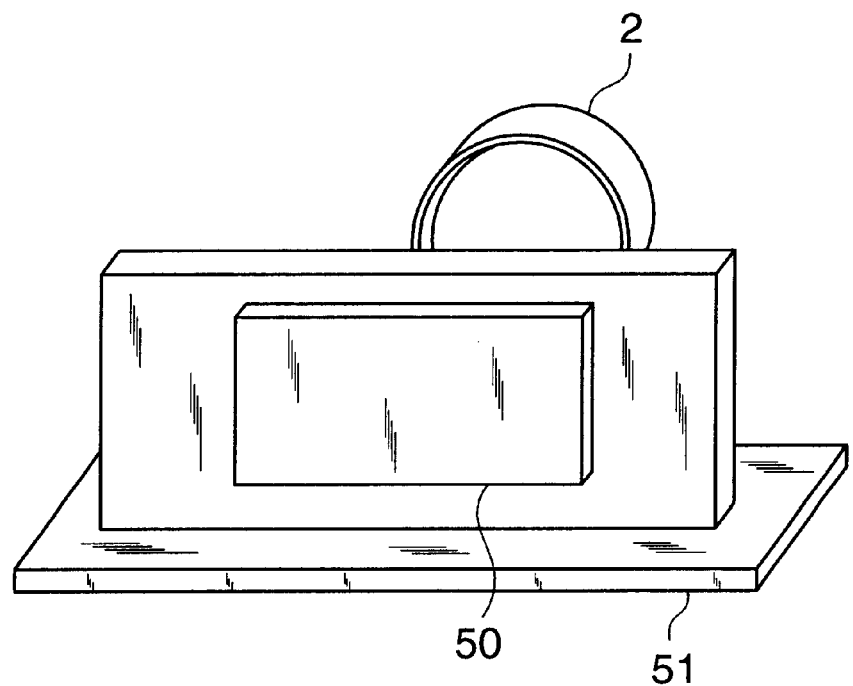
FIGS. 14A and 14B are perspective views showing constructions of a filter driving mechanism according to the second embodiment of the present invention.
Figure 14B:
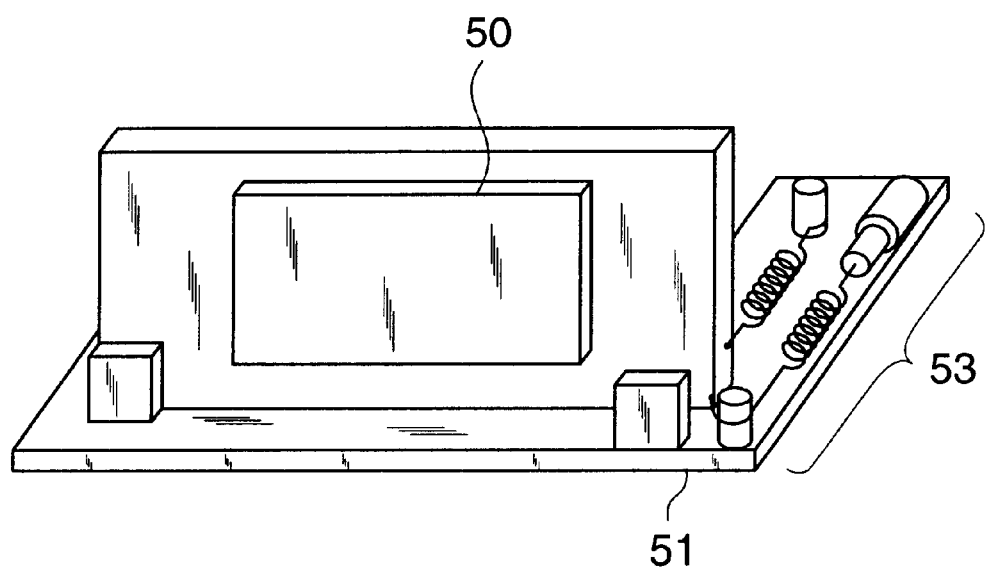

The shift of the imaging position is executed in the first embodiment by providing a mechanism for driving the infrared cut filter arranged at the front surface of the imaging lens. This second embodiment is characterized in that the infrared cut filter and a filter driving mechanism for driving the filter are modularized to easily be replaceable. FIG. 14A is a perspective view showing an infrared cut filter holder not having the filter driving mechanism. In the figure, an infrared cut filter 50 is fixedly provided at a filter holder 51 arranged at the front surface of the imaging lens 2. Further, FIG. 14B is a perspective view showing one constructional example of the filter driving mechanism of the second embodiment. In the figure, the infrared cut filter 50 is provided at the filter holder 52 and a filter driving mechanism 53 for driving the infrared cut filter 50 as the optical flat plate 4 is also integrally provided at the filter holder 52.

In case where the device has the infrared cut filter holder 51 without being provided with the filter driving mechanism shown in FIG. 14A, it may be replaced with the infrared cut filter holder 52 provided with a filter driving mechanism shown in FIG. 14B as an option by manipulation of a repairing man. Further, the infrared cut filter holder 52 provided with the filter driving mechanism 53 shown in FIG. 14B may be installed in advance at the time of manufacturing the device. In particular, when the fixed-type infrared cut filter holder 51 installed in advance to the device is replaced with the infrared cut filter holder 52 provided with the filter driving mechanism 53, the existing infrared cut filter 50 can be used. By this, a change in optical path of the imaging optical path is not generated, as well as it is not necessarily readjust the focus state of the imaging optical system.

C. Third Embodiment

Figure 15:
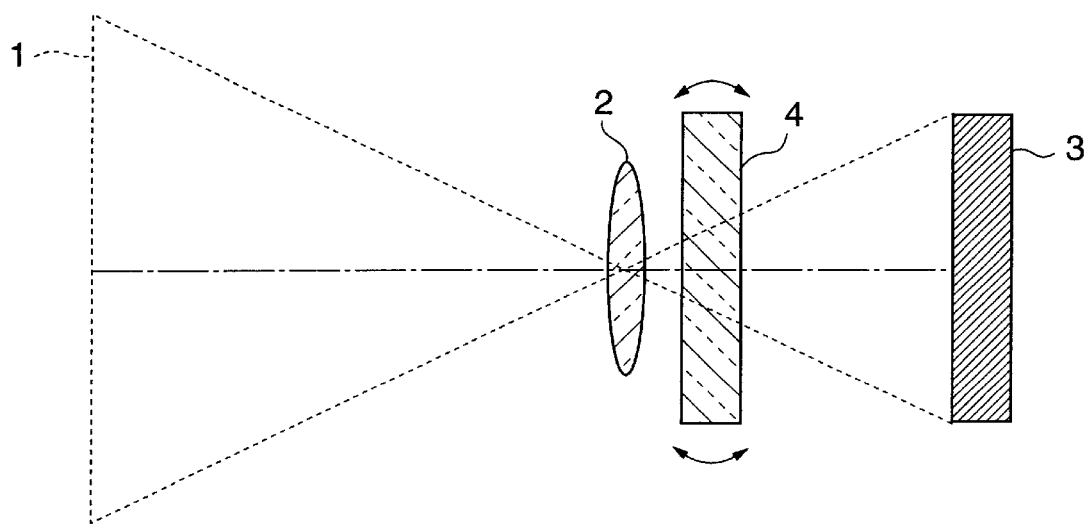
FIG. 15 is a schematic view showing a construction of an optical system according to the third embodiment.

The optical flat plate 4 is arranged between the imaging lens 2 and the document 1 in the first embodiment. The merit to arrange the plate 4 at this position is that it does not matter whether the flat accuracy of the optical flat plate 4 is inexact, as well as that the precision upon setting the angle of the optical flat plate 4 becomes inexact since the slope angle of the optical flat plate 4 becomes relatively large such as 3.2 degrees as described above. On the other hand, the optical flat plate 4 is arranged between the imaging lens 2 and the CCD sensor 3 in the third embodiment. FIG. 15 is a schematic view showing a construction of an optical system according to the third embodiment. For example, the optical flat plate 4 having an aberration compensating function worked integral with the imaging lens 2 is arranged behind the imaging lens 2, whereby the image shift is performed by moving this optical flat plate 4.

Figure 16:
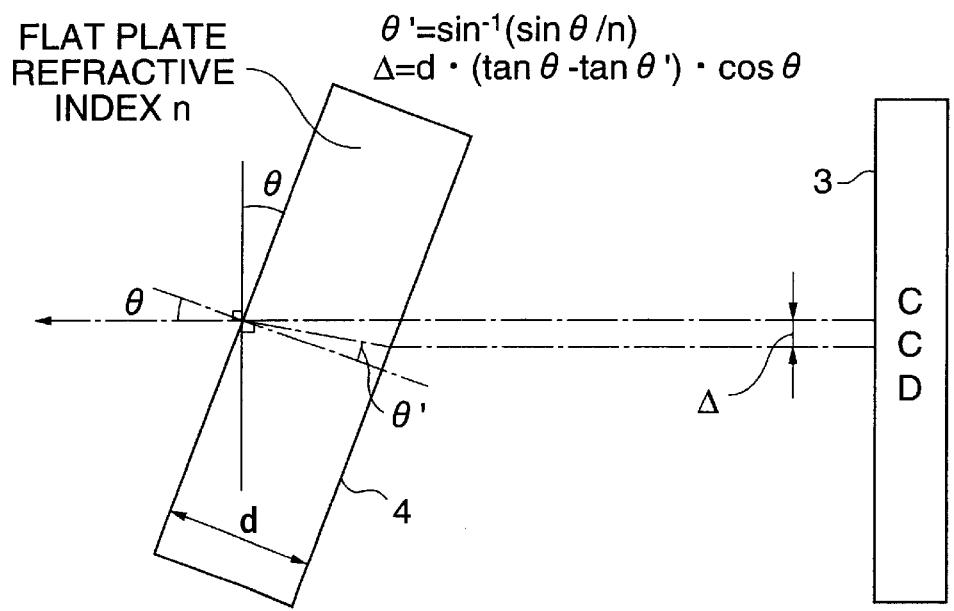
FIG. 16 is a conceptional view showing how the imaging condition changes on the CCD sensor depending upon the slope of the optical flat plate according to the third embodiment.

FIG. 16 is a conceptional view showing how to change the imaging condition on the CCD sensor depending upon the slope of the optical flat plate. From the characteristics of the laws of refraction and circular functions of light, a parallel shift amount Δ of an optical ray in the case of inclining the optical flat plate 4 is obtained from a formula in the figure. It is understood from this relationship that, when the optical flat plate 4 having a refractive index n=1.6 and a thickness of d=10 mm is inclined at an angle of 0.07 degrees, the imaging position on the CCD sensor 3 is shifted by approximately 4.5 microns. Therefore, the sampling position can be shifted by 0.5 pixels in the case of using the CCD sensor having a pitch of 9 microns.

Figure 17:
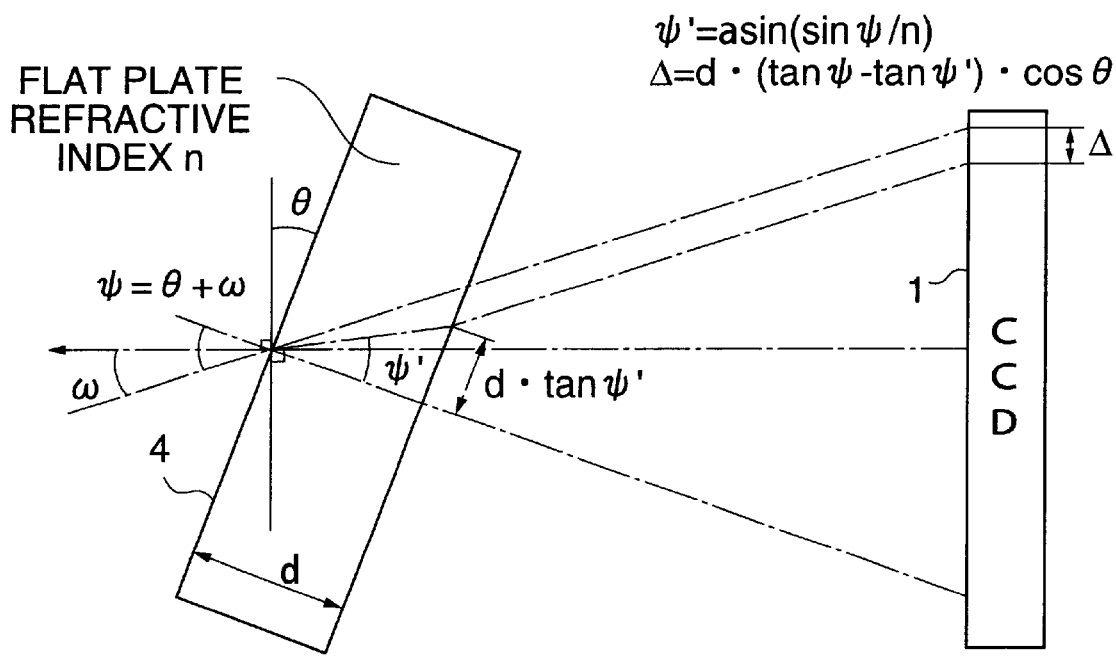
FIG. 17 is a conceptional view explaining the imaging condition on the CCD sensor 3 out of the optical axis (vicinity portion of the read document) in the third embodiment.
Figure 18:
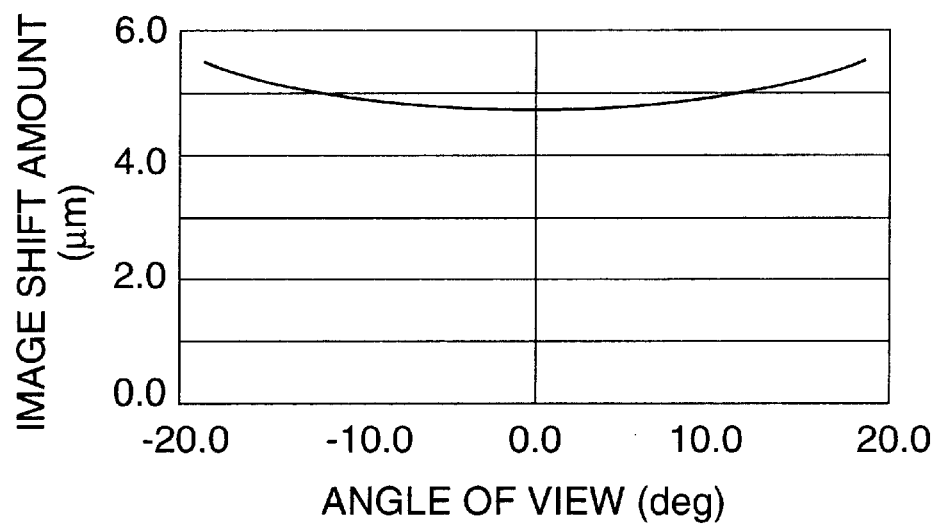
FIG. 18 is a conceptional view showing an image shift amount on the surface of the CCD sensor 3 with respect to the angle of view including the one on the optical axis and the one out of the optical axis.

Subsequently, FIG. 17 is a conceptional view explaining the imaging condition on the CCD sensor 3 at the portion out of the optical axis (vicinity portion of the read document) in the above-mentioned construction. In the figure, a position of an object at the portion out of the optical axis is represented by a half angle of view ω. When the optical flat plate having a refractive index of n=1.6 and a thickness of d=10 mm is inclined at an angle of approximately 0.07 degrees, the parallel shift amount Δ of an optical ray can be obtained in accordance with the formula in the figure. Moreover, FIG. 18 is a conceptional view showing an image shift amount on the surface of the CCD sensor 3 with respect to the angle of view including the one on the optical axis and the one out of the optical axis. As shown in the figure, an image shift of 5.3 microns can be obtained at the center portion (on the optical axis) and an image shift of 5.3 microns can be obtained at the vicinity portion (the portion out of the optical axis).

When the optical flat plate 4 is arranged between the imaging lens 2 and the CCD sensor 3 for obtaining an image shift by inclining the optical flat plate 4, the slope amount decreases as much as reduction rate of the imaging lens 2 and a thickness of the thick optical flat plate 4 to thereby require a precision, but instead of that, there is a merit of shortening the working distance.

Although the part that shifts by a half or a third of the sensor sampling pitch in the fast-scanning direction is implemented by inclining the optical flat plate 4, arranged on the way of the imaging optical path, toward the fast-scanning direction with respect to the optical axis in the first to third embodiments, the implementing method is not limited thereto. For example, the CCD sensor 3 may be caused to do parallel movement toward the fast-scanning direction or the imaging lens 2 may be caused to do parallel movement in the fast-scanning direction. The moving amount in this case becomes a half of the sensor pixel pitch, so that a control with high precision is required.

Further, the CCD sensor 3 and the lens 2 are moved toward the fast-scanning direction as an integral unit. The moving amount in this case becomes a half of the sampling pitch of the document surface conversion, so that the precision may relatively be inexact. Moreover, this case is advantageous in the point that the difference in the image shift amount is not generated due to the angle of view unlike the optical flat plate 4. Additionally, the first to the third embodiments perform a scan (scan in one direction) in the same direction as the normal reading direction in plural times in order to perform plural times of reading scans from the viewpoint of the reproducibility of each reading scan. However, the reading scan may be performed respectively in the movement toward the forward direction (going path) and the movement toward the reverse direction (returning path) in order to shorten the reading time.

As described above, according to the present invention, when an optical image of the object to be read is read while moving in the slow-scanning direction by a moving part the reading position of the object to be read by the reading part, a scan controlling part controls the moving part to scan the object to be read plural times as well as the reading position of the object to be read by the reading part is changed in the fast-scanning direction by a reading position changing part for every scan by the scan controlling part, whereby the reading position of the object to be read by the reading part is changed in the fast-scanning direction and the moving speed of the moving part is changed by a moving speed changing part in accordance with the number of times of the scan performed by the scan controlling part. Therefore, the advantage is obtained that high-speed reading can be performed with high precision by using an image shift method without generating sampling moire. Further, there is an advantage that reading with higher speed than that by the reading device using an exclusive multiple pixel sensor can be realized with a simple construction.

What is claimed is:

1. An image reading device comprising:
   a reading part that reads an optical image of an object to be read;
   a moving part that moves in a slow-scanning direction a reading position of the object to be read by the reading part;
   a scan controlling part that scans the object to be read plural times by controlling the moving part;
   a reading position changing part that changes in a fast-scanning direction the reading position of the object to be read by the reading part for every scan by the scan controlling part; and
   a moving speed changing part that changes the moving speed of the reading position by the moving part in accordance with the number of scanning times by the scan controlling part.

2. The image reading device claimed in claim 1, wherein the reading position changing part changes the reading position of the object to be read by the reading part in the fast-scanning direction by inclining a parallel flat plate disposed in an imaging optical path.

3. The image reading device claimed in claim 2, wherein the parallel flat plate functions as an optical filter.

4. The image reading device claimed in claim 2, wherein the parallel flat plate is positioned between an imaging part that forms an image with a reflective light from the object to be read on the reading part and the object to be read.

5. The image reading device claimed in claim 2, wherein the parallel flat plate is positioned between an imaging part that forms an image with a reflective light from the object to be read on the reading part and the reading part.

6. The image reading device claimed in claim 1, wherein the reading position changing part changes the reading position of the object to be read by the reading part in the fast-scanning direction by moving the reading part.

7. The image reading device claimed in claim 1, wherein the reading position changing part changes the reading position of the object to be read by the reading part in the fast-scanning direction by moving an imaging optical system comprising an imaging lens and a sensor.

8. The image reading device claimed in claim 1, wherein the reading position changing part changes the reading position of the object to be read by the reading part in the fast-scanning direction by integrally moving the reading part and an imaging optical system comprising an imaging lens and a sensor.

9. The image reading device claimed in claim 1, wherein the scan controlling part scans the object to be read plural times respectively in a going direction and a returning direction by controlling the moving part.

10. The image reading device claimed in claim 1, wherein the moving speed changing part sets the moving speed by the moving part at 1/scanning times.

11. The image reading device claimed in claim 1, wherein the reading position changing part sets the changing amount of the reading position of the object to be read by the reading part at approximately 1/scanning times of a sampling pitch of the reading part.

12. The image reading device claimed in claim 1, wherein the reading position changing part includes a first operational mode in which the reading position of the object to be read by the reading part does not change in the fast-scanning direction and a second operational mode in which the reading position of the object to be read by the reading part changes in the fast-scanning direction, and further comprises a switching part that selectively switches between the first operational mode and the second operational mode in accordance with the number of scanning times.

13. The image reading device claimed in claim 1, further comprising a storing part that stores the image of the object read by the reading part for every scan.

14. The image reading device claimed in claim 13, further comprising a composing part that composes images of the object to be read for every scan stored in the storing part.

15. The image reading device claimed in claim 1, wherein the scan controlling part synchronizes the scanning operation and the reading operation by the reading part by controlling the moving part.

16. The image reading device claimed in claim 1, wherein the scan controlling part preliminarily moves the moving part before performing the scan plural times.

17. The image reading device claimed in claim 1, wherein the scan controlling part preliminarily moves the moving part under the same scanning condition as in the scans of plural times.

* * * * *